United States Patent [19]

Winchell et al.

[11] Patent Number: 4,539,172
[45] Date of Patent: Sep. 3, 1985

[54] METHOD OF BLOWMOLDING A CONTAINER HAVING AN INTEGRAL INNER DISPENSING OUTLET

[75] Inventors: David A. Winchell, Spring Grove; Thomas A. Fowles, McHenry, both of Ill.

[73] Assignee: Baxter Travenol Laboratories, Inc., Deerfield, Ill.

[21] Appl. No.: 562,247

[22] Filed: Dec. 16, 1983

[51] Int. Cl.³ .................. B29C 17/07; B29D 3/00
[52] U.S. Cl. .................. 264/515; 53/453;
53/140; 264/516; 264/524; 264/525; 425/503;
425/524
[58] Field of Search ............ 264/515, 516, 524, 525;
425/503, 524; 53/453, 140

[56] References Cited

U.S. PATENT DOCUMENTS

| Re. 27,155 | 7/1971 | Hansen | 18/5 BF |
|---|---|---|---|
| 2,372,181 | 3/1945 | Barr | 215/33 |
| 3,358,062 | 12/1967 | Lemelson | 264/515 X |
| 3,597,793 | 8/1971 | Weiler | 18/5 BF |
| 3,694,534 | 9/1972 | Troadec | 264/515 X |
| 3,705,931 | 12/1972 | Confer et al. | 264/515 |
| 3,730,372 | 5/1973 | Komendowski | 215/32 |
| 3,804,282 | 4/1974 | Komendowski | 215/32 |
| 3,851,029 | 11/1974 | Cornett, III et al. | 264/89 |
| 3,919,374 | 11/1975 | Komendowski | 264/90 |
| 3,969,455 | 7/1976 | Moller | 264/89 |
| 4,093,093 | 6/1978 | Fowles et al. | 215/251 |
| 4,176,755 | 12/1979 | Winchell | 215/32 |
| 4,226,334 | 10/1980 | Weiler et al. | 215/355 |
| 4,319,701 | 3/1982 | Cambio | 222/541 |
| 4,378,891 | 4/1983 | Fowles et al. | 215/32 |

FOREIGN PATENT DOCUMENTS 2105250A 3/1983 United Kingdom .

OTHER PUBLICATIONS

U.S. Ser. No. 296,368 filed 8/26/1981, Weiler et al.
U.S. Ser. No. 402,982 filed 8/3/1982, Weiler.

Primary Examiner—Jan Silbaugh
Attorney, Agent, or Firm—Paul C. Flattery; John P. Kirby, Jr.; Bradford R. L. Price

[57] ABSTRACT

A method is disclosed for forming, filling and hermetically sealing a blowmolded container having a sterile integral inner dispensing outlet, all in a single sterile operation. The method is directed toward establishing a preferably hermetic seal between the inner dispensing outlet and the container neck, by establishing the seal early in the blowmolding cycle. This is accomplished by mounting the dispensing outlet-defining tubular member about a unique fluid supply mandrel. The supply mandrel thereby also serves as a check and the tubular member of the to-be-formed container serves as a tool in blowmolding. The dispensing outlet/container neck seal is thus formed before the blowmolding step.

1 Claim, 7 Drawing Figures

METHOD OF BLOWMOLDING A CONTAINER HAVING AN INTEGRAL INNER DISPENSING OUTLET

TECHNICAL FIELD OF THE INVENTION

The present invention relates generally to plastic container blowmolding and more specifically to a method for blowmolding a hermetically sealed container having a sterile inner dispensing outlet.

BACKGROUND OF THE INVENTION

Many medical liquids, such as sterile water, saline solution and the like, are packaged in containers wherein dispensing of the liquid is performed by simply pouring out the contents, as opposed to, for example, intravenous administration. Such pour-type dispensing is utilized, for example, in the operating room for use in wound irrigation and the like. Such storage and dispensing of medical liquids has been satisfactorily met by the use of one-piece, hermetically sealed plastic containers which are formed, filled and sealed in a single sterile operation. Such containers are shown, for example, in U.S. Pat. Nos. 3,730,372 or 3,804,282 to Komendowski and U.S. Pat. No. 4,176,755 to Winchell. Such containers are typically opened by turning a jacking ring having internal threads, which is mounted about external threads on the top of the one-piece plastic container. By rotating the jacking ring, an axial force of compression or tension is exerted upon and breaks a frangible line of weakness which has been formed in the container during the molding process. After the frangible line of weakness is broken, the top is removed and the contents are poured out of the container.

The pour lip comprises the area adjacent to the now broken frangible line of weakness. Since the external threads and the outer portion of the now broken frangible line of weakness are on the outside of the container, they are not in perfectly sterile condition. Therefore, where thread and pouring lip sterility are necessary, such a container cannot be used.

A container having a sterile pouring lip and internal threads is shown in U.S. Pat. No. 4,093,093 to Fowles and Winchell. That container has a selectively opened interior cap covered by a plastic overcap which is melt sealed to the container in a separate operation. The overcap maintains the inner outlet in sterile condition until the container is opened. Such a container is, however, more expensive to manufacture than the form/fill/seal containers previously described.

A container having a sterile pouring surface and utilizing the relatively low-cost and sterility-ensuring form/fill/seal construction is shown in U.S. Pat. No. 4,378,891 to Fowles, et al. Disclosed therein is an integral hermetically sealed form/fill/seal container having a separately formed tubular member which serves as an inner dispensing outlet. After the container is blowmolded and filled, the tubular member is inserted into the cooling neck portion of the container. A fluid-tight seal is formed between the tubular member and the neck of the container. A selectively removable cap is mounted on the tubular member. After the tubular member is force fit into the neck, the top of the container is formed, hermetically enclosing the inner tubular member.

Such a container construction may not guarantee a hermetic seal between the inner dispensing outlet formed by the tubular member, and the neck of the container, or a seal which is as strong as is desirable. Also, the inner dispensing outlet is added in a separate step, after blowmolding and filling of the container body.

SUMMARY OF THE INVENTION

The method of the present invention provides a blowmolded, form/fill/seal container having an inner dispensing outlet with a sterile pouring lip and sterile threads below the pouring lip. The method of the present invention provides a permanent, preferably hermetic seal between the inner dispensing outlet and the neck of the container. The method of the invention provides a process whereby the tubular member which forms the inner dispensing outlet is joined to the container neck simultaneously with the blowmolding step, thereby eliminating a separate step in the manufacturing operation.

The present invention requires minimum changes to apparatus currently available for forming, filling and sealing one-piece containers. The method advances a unique filling or supply mandrel with the tubular member thereabout, thus urging the tubular member into fluid-seal relationship with the container neck. The tubular member itself is utilized as a tool during the manufacturing process, sealing the container body to facilitate the blowmolding step.

The invention is also directed to the filling mandrel itself, which also serves as a chuck to engage the tubular member.

DETAILED DESCRIPTION OF THE PREFERRED EMBODIMENTS

Figure 1:
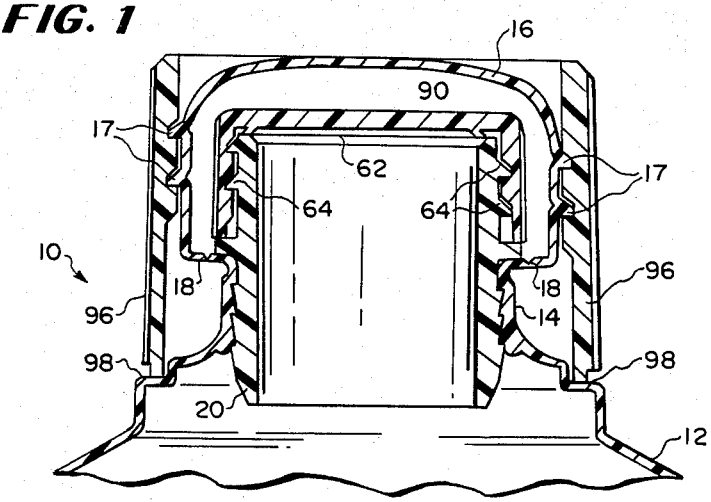
FIG. 1 is a fragmentary, vertical, cross-sectional view of a container made in accordance with the method of the present invention.
Figure 3:
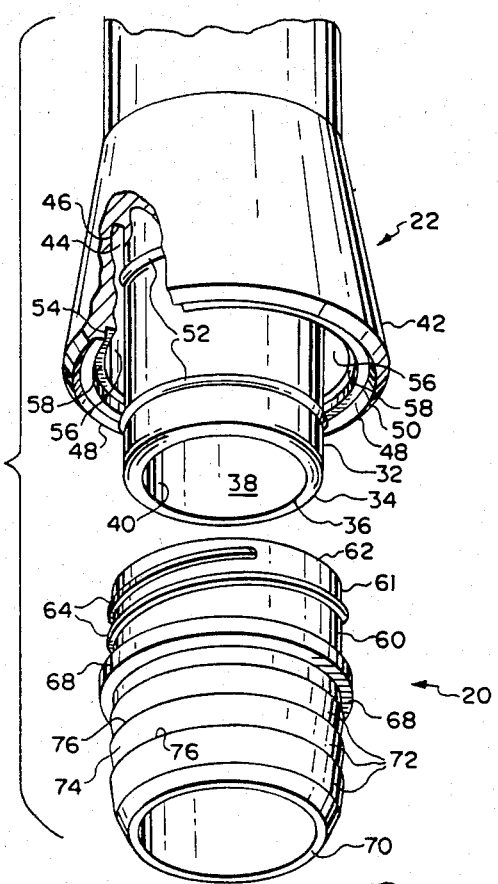
FIG. 3 is a perspective view of the combination chuck and filling mandrel and the tubular member to be mounted thereon.
Figure 6:
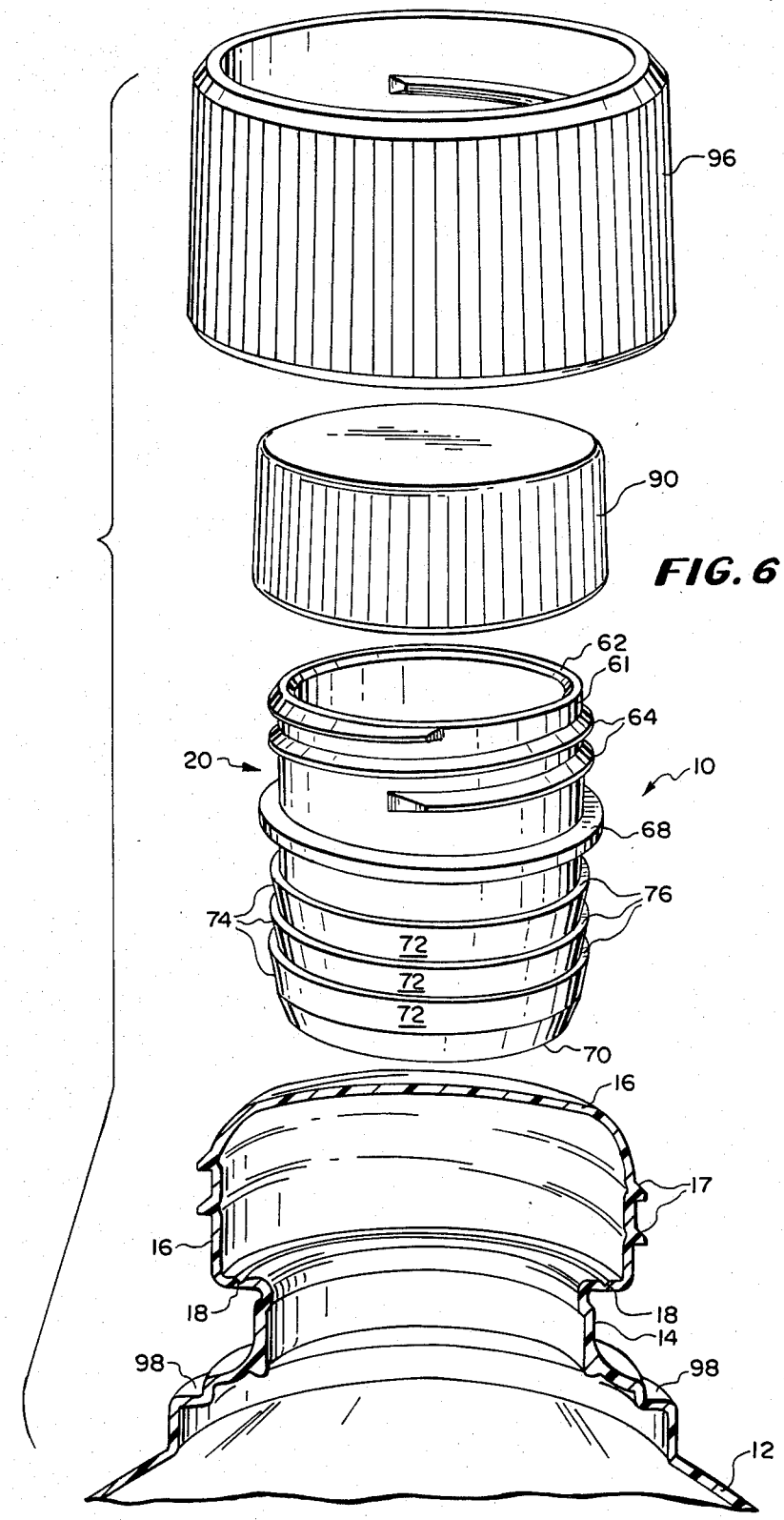
FIG. 6 is an exploded view, partially in section, of a container embodying the present invention.

Generally, referring to FIGS. 1 and 6, the present invention relates to a method for manufacturing a one-piece, hermetically sealed container 10 having a body 12, a neck 14 and an outer closure or top 16. An intentionally formed frangible line of weakness 18 is disposed between the neck 14 and the outer closure 16. The container 10 includes a tubular member 20 mounted in the neck 14 of the container. The tubular member 20 serves as a dispensing outlet for the container contents. Referring to FIGS. 3 and 4, a strong seal between the tubular member 20 and the neck 14 is obtained by mounting the tubular member 20 to the fluid supply or filling mandrel 22 and inserting the tubular member 20 into the neck 14 both with the supply mandrel 22 and before blowmolding of the container body 12.

Figure 2:
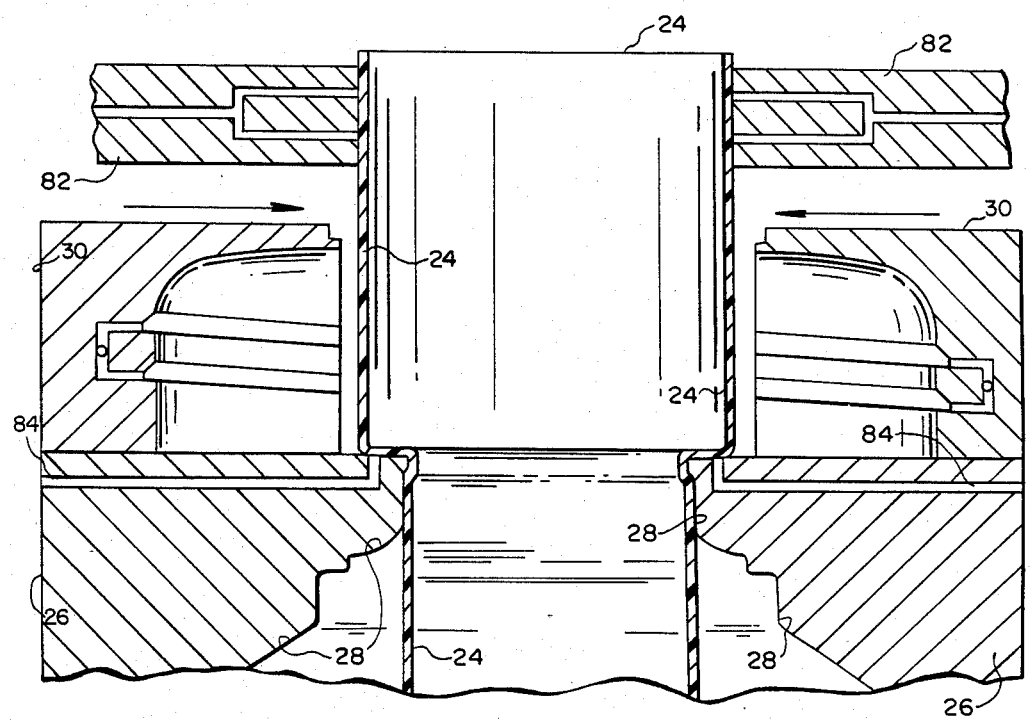
FIG. 2 is a fragmentary, vertical cross-sectional view of the mold used in making the container.

More particularly, the method of the invention results in a container 10 containing sterile medical liquid such as sterile water or sterile saline. These solutions are supplied to hospitals for medical use. The container is preferably of polypropylene, polyethylene or any other plastic material suitable for blowmolding and also compatible with medical liquids. As seen in FIG. 2 and in U.S. Pat. No. RE 27,155 to Hansen, which is incorporated herein by reference, the container 10 is made by extruding a relatively hot plastic parison 24, such as polypropylene at 390° F., between a pair of movable mold halves 26. The movable mold halves 26 include interior surfaces 28 which define the shape of the container body 12 and at least a portion of the container neck 14. The extruded tubular plastic parison 24 is positioned within the container-defining mold which, in addition to movable mold halves 26 includes upper movable mold halves 30.

As mentioned above, U.S. Pat. No. 4,378,891 discloses the use of a tubular member serving as a sterile inner dispensing outlet. The container of that invention is formed by lowering a filling mandrel, such as the mandrel shown in U.S. Pat. No. 3,597,793 to Weiler, et al., within the tubular parison and blowmolding the container by passing fluid under pressure through the filling mandrel. The filling mandrel is then withdrawn and the tubular member is then forced into the formed container neck, thereby forming a fluid tight seal.

In contrast, the method of the present invention inserts a tubular member 20 into the parison before blowmolding. As seen in FIG. 3, the fluid supply mandrel 22 serves a dual purpose; it is also a chuck. The supply mandrel 22 includes a nozzle 32 with an open end 34 defining a mouth 36 or outlet to the channel 38 defined by an interior wall 40 of the supply mandrel 22.

The supply mandrel 22 includes an annular skirt 42 which extends short of the mouth 36 and is spaced from the nozzle 32 so as to form an annular groove 44 between the nozzle 32 and the skirt 42. The annual groove 44 includes a base 46 which bridges the skirt 42 and the nozzle 32.

The annular skirt 42 includes a rim 48 projecting from the distal end 58 of the skirt 42. The rim 48 defines a relatively sharply pointed surface 50. Additionally, the annular skirt 42 may include a depression 54 formed in the interior skirt surface 56 and in the distal end 58 of the skirt 42. The depression 54 serves as a seat for the tubular member 20.

A plurality of projections such as circular rings 52 are disposed about the nozzle 32. The projections need not take the form of circular rings but may in fact be intermittent bumps or other projection forms. The projections reduce the area of contact between the nozzle 32 and the tubular member 20.

Figure 4B:
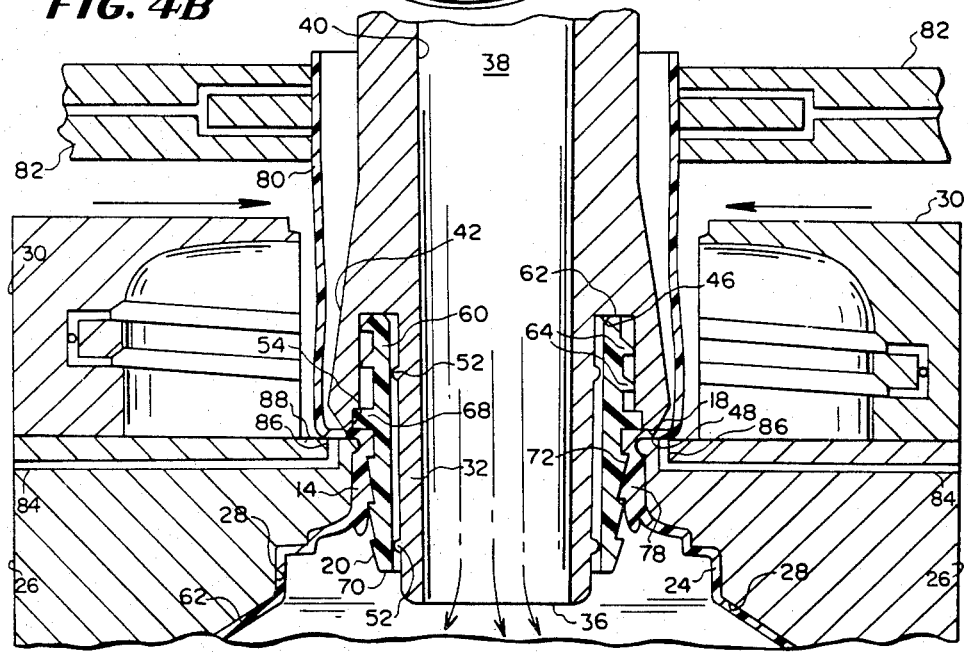
FIGS. 4A and 4B are fragmentary, vertical, cross-sectional views, illustrating insertion of the tubular member and filling mandrel into the parison.
Figure 4A:
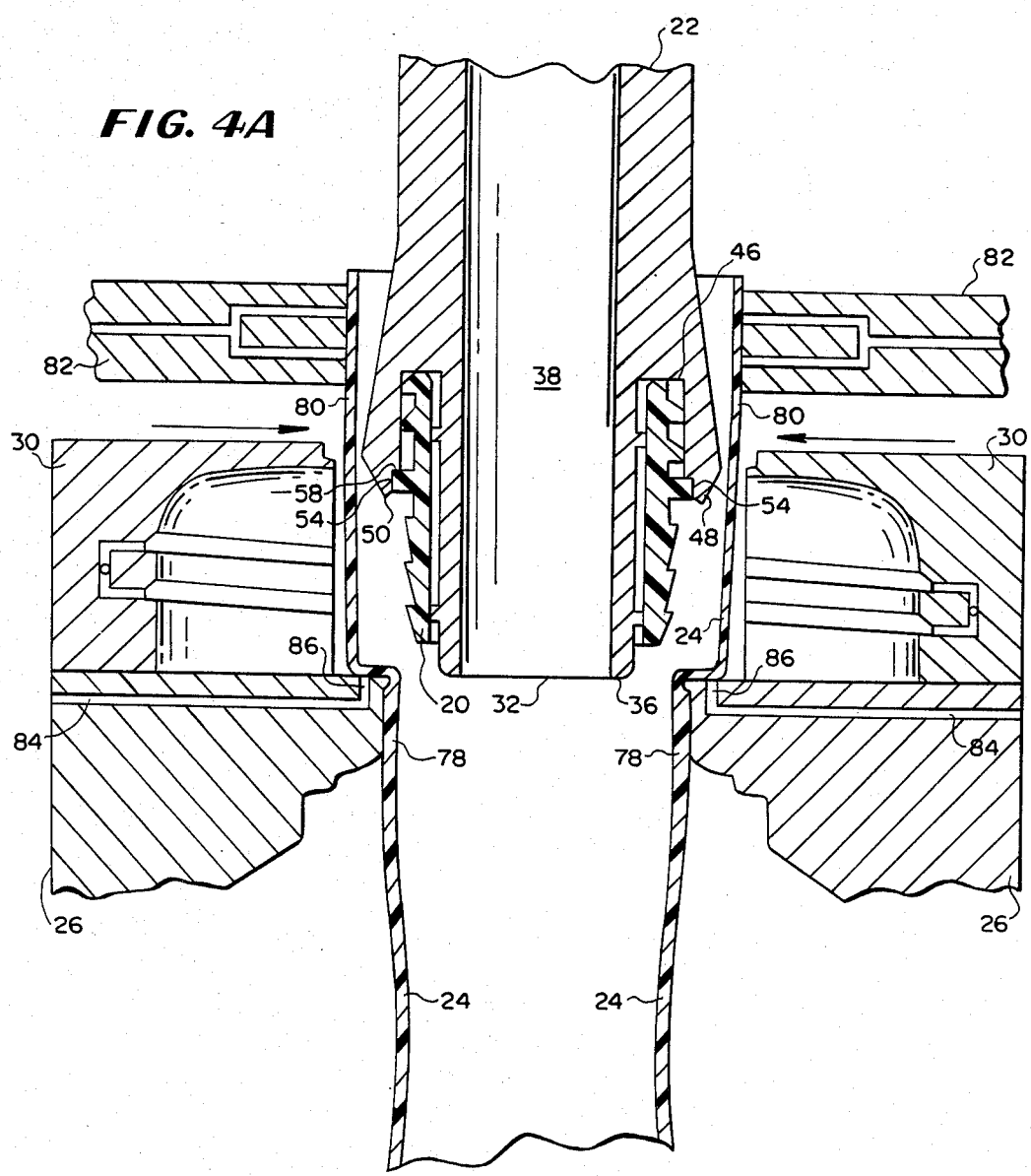

As seen in FIGS. 3, 4A, and 4B, the tubular member 20 is hollow with a generally cylindrical sidewall 60. The tubular member 20 is made of a plastic which is strong enough to serve as a dispensing outlet and is compatible with medical liquids. In order to ensure a good seal with the container, it may be desirable to make the tubular member 20 of the same plastic material as the remainder of the container, although it is believed that this is not necessary. One end 61 of the tubular member 20 defines a pour lip 62. External threads 64 are disposed on the outside of the cylindrical sidewall 60 near the pour lip 62 of the tubular member 20.

In the preferred embodiment of the invention an annular ridge 68 extends around the exterior of the sidewall 60, about midway on the sidewall. Toward the opposite end 70 of the tubular member 20 there are disposed one or more annular barbs of sawteeth 72 which present an outwardly angled surface 74 toward the opposite end 70 and a perpendicular or inwardly angled surface 76 toward the pour lip end 61.

The tubular member 20 is mounted on the supply mandrel 22. This may be performed, for example, by simply lowering the supply mandrel 22 such that the nozzle 32 is inserted through the tubular member 20. The only surface contact between the nozzle 32 and the generally cylindrical sidewall 60 of the tubular member is at the circular rings 52. The nozzle is inserted until the pour lip 62 and the annular ridge 68 contact the base 46 of the annular groove 44 and the depression 54 of the annular skirt 42, respectively.

The supply mandrel 22, with the tubular member 20 thereon, is moved until it is in substantially axial alignment with the neck-defining portion 78 of the parison 24, as shown in FIG. 4A. The upper end 80 of the parison 24 is held open by a pair of vacuum jaws 82. In addition, in the preferred embodiment a partial vacuum is applied through vacuum lines 84 in the movable mold halves 26. The vacuum lines 84 have outlets 86 on the top 88 of the movable mold halves 26, circumferentially exterior of the to-be-formed frangible line of weakness 18. It is believed that the partial vacuum applied through the vacuum lines 84 at least partially conforms the neck-defining portion 78 of the parison 24 to the interior surfaces 28 of the mold halves 26 so that the neck 14 of the container 10 is at least partially formed before blowmolding.

Immediately after positioning the parison within the mold, the supply mandrel 22 with the tubular member 20 now secured thereabout is lowered so that the nozzle 32 is advanced until it is within the neck-defining portion 78 of the parison 24. As best seen in FIG. 4B, further advancement of the supply mandrel 22 urges the tubular member 20 into fluid-seal relationship with the container neck. Stated differently, urging of the tubular member 20 into the parison forms part of the container neck 14 by expanding the neck-defining portion 78 of the parison 24 into compressive, conforming relationship with interior surfaces 28 of the mold halves 26.

The supply mandrel 22 is advanced until the rim 48 is depressed into the parison to form the frangible line of weakness 18. Together, the annular skirt 42 and the annular ridge 68 seal that portion of the mold below the frangible line of weakness 18, except at the nozzle 32. The barbs 72 of the tubular member 20 are locked within the container neck 14.

The container body 12 is now blowmolded by injecting fluid through both the supply mandrel and the tubular member, forcing the fluid through the channel 38, out the mouth 36 of the nozzle 32. The injected fluid expands the parison 24 into conforming relationship with interior surfaces 28 of the mold halves 26, thereby forming the container body 12. The injected fluid which expands the parison, performing the blowmolding step, may be the liquid contents of the container to be stored therein. Alternatively, the blowmolding fluid may be sterile air. In this instance, after blowmolding, injection of the sterile air is stopped and, with the supply mandrel 22 still in place, the container contents are supplied into the body 12 via the channel 38.

After the container is filled, the supply mandrel 22 is withdrawn. Because of the relatively small surface contact between the sidewall 60 of the tubular member 20 and the nozzle 32, withdrawal of the mandrel 22 requires little force, so that the seal between the dispensing outlet-defining tubular member 20 and the container neck 14 is not disturbed.

Figure 5:
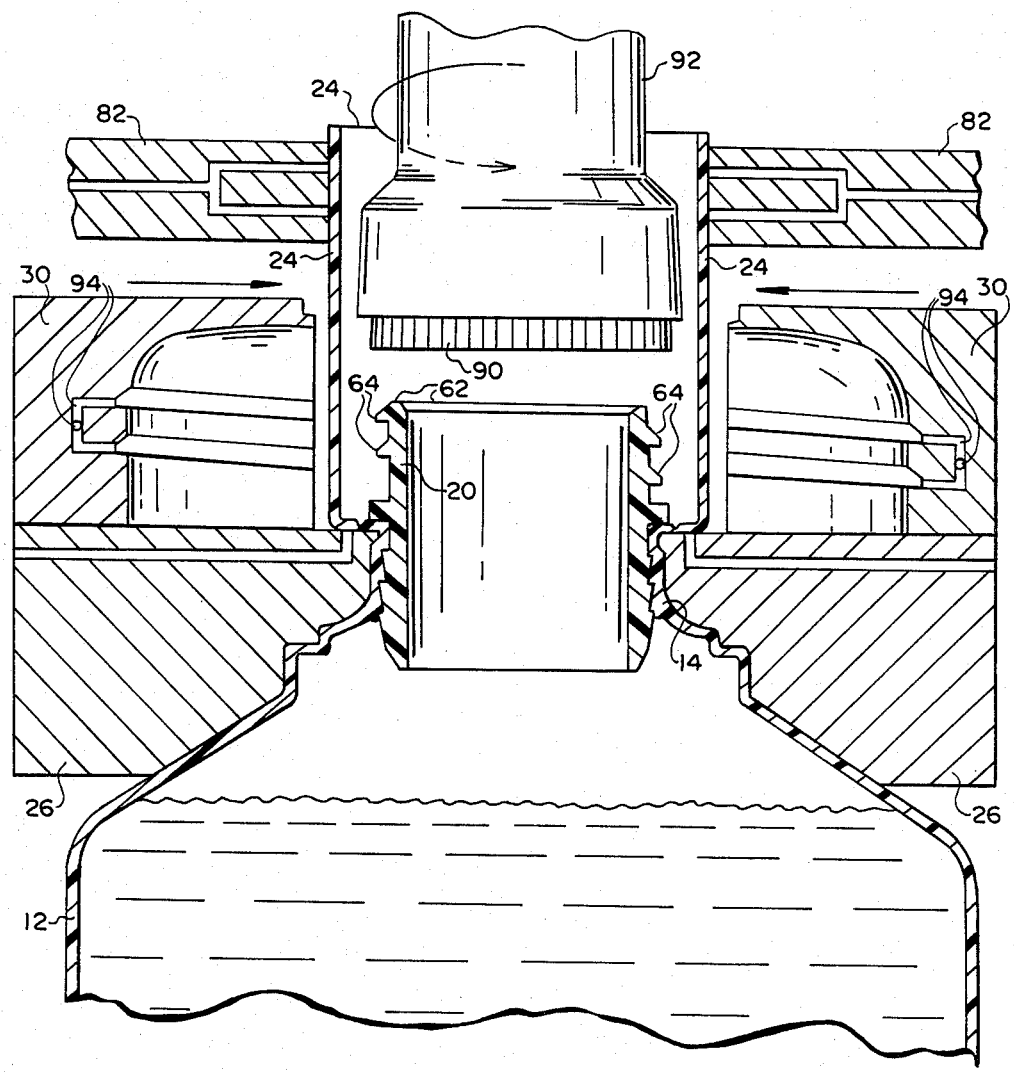
FIG. 5 is a fragmentary, vertical, cross-sectional view illustrating attachment of an inner closure to the dispensing outlet before formation of the outer closure.

The supply mandrel 22 is now moved out of the way. In the preferred embodiment, a cap 90 with internal threads is installed about the dispensing outlet as illustrated in FIG. 5, to fluid-seal the container at the pour lip 62. This may be accomplished by attaching a cap 90 to a cap tool 92. The cap may be mounted to the cap tool 92 by interference fit or by, for example, a vacuum applied through the cap tool 92. The cap tool 92 with the cap 90 secured thereto is brought into axial alignment with the dispensing outlet formed by the tubular member 20. The cap tool may be rotating as it is lowered so that the cap 90 is screwed onto the external threads 64 of the tubular member 20. At a certain tightness, the twisting force of the cap tool 92 may be overcome, signaling withdrawal of the cap tool 92, leaving the cap 90 mounted on the dispensing outlet. Alternate structures are of course available, such as for example, a snap-on cap instead of a screw-on cap.

The upper movable mold halves 30 are now closed about the parison 24, and a vacuum is applied through outer closure vacuum lines 94. The applied vacuum expands the upper portion of the parison, forming the outer closure 16 and hermetically sealing the dispensing outlet from the environment. During this operation the interior of the parison is flushed with sterile air, and other precautions, such as use of ultraviolet lights, are taken to ensure the sterility of the contents. The outer closure 16 maintains the dispensing outlet, including the tubular member 20, the pouring lip 62 and the cap 90, in sterile condition until the outer closure 16 is removed.

As seen in FIGS. 1 and 6, a jacking ring 96 of rigid plastic material is mounted about the external threads 17 of the outer closure 16 after formation of the container 10. An annular shoulder 98 on the container body 12 engages the bottom edge of the jacking ring 96 when the jacking ring is rotated downwardly. This exerts an upward force on the outer closure 16, breaking the frangible line of weakness 18 and opening the container for access to the sterile dispensing outlet.

One of the key features of the method of the present invention is that it provides a strong, preferably hermetic seal between the tubular member 20 and the container neck 14, providing a dispensing outlet integral with the container 10 such that the tubular member 20 cannot be removed from the neck by manual pulling or tugging forces.

A typical cycle time for a form/fill/seal blowmolding operation to form a one-liter container is approximately 30 seconds. When the tubular member 20 is inserted into the container neck after blowmolding and filling of the container, approximately 75% of the cycle time has elapsed or, in the example, approximately 22 seconds. Thus, the parison has been cooling for some time, aided by contact with the mold and with the blowmolding and filling fluid, before the tubular member is inserted. However, with the present invention, the tubular member 20 is urged into sealing contact with the parison 24 after approximately only 10% of the cycle time. In the example this would be only about 3 seconds. Thus, the tubular member 20 is forced into sealing relationship with a still relatively hot parison portion 78. It is believed that this hotter, more molten-like parison contributes to the stronger seal provided by the method of the present invention.

It is believed that the method may be performed with variations from the above-described process. For example, it may be possible to lower the supply mandrel 22 into the parison, with the tubular member secured to the mandrel, without first expanding the neck portion of the parison. This may make unnecessary the vacuum lines 84 although the vacuum applied through lines 84 is preferred in order to prepare the parison for formation of the frangible line of weakness 18.

Still another variation would be to maintain the neck portion 78 of the parison free from contact with the interior surfaces 28 of the mold halves 26 until the parison is urged into virtually simultaneous contact with the tubular member. This could be performed by keeping the mold halves 26 open until the supply mandrel and tubular member are advanced. The mold halves 26 which include the neck portion of the mold would then be closed about the parison such that the neck portion 14 of the container is formed by compression of the neck-defining portion 78 of th parison between the tubular member 20 and the mold halves 26.

While several embodiments and features have been described in detail herein and shown in the accompanying drawings, it will be evident that various further modifications are possible without departing from the scope of the invention.

What is claimed is:

1. A method of making a hermetically sealed container having a body, a neck, an outer closure and an inner dispensing outlet defined by a hollow tubular member, the steps comprising:

extruding a tubular, plastic parison;

positioning the pairson within a container-defining mold;

securing the outlet-defining tubular member upon a fluid supply mandrel, the fluid supply mandrel including a nozzle having a channel therethrough defined by an interior wall and an open end defining a mouth to the channel, an annular skirt depending from and extending about the nozzle, the annular skirt being spaced from the nozzle by an annular groove, the annular groove including a base, the mandrel further including a relatively sharp rim projecting from a distal end of the annular skirt and a plurality of projections disposed about the nozzle, the nozzle extending beyond the distal end of the annular skirt, such that the hollow, outlet-defining tubular member is mounted in the annular groove, between the projections about the nozzle and the annular skirt;

advancing the mouth of the supply mandrel with the tubular member thereabout toward the pairson, simultaneously both urging the tubular member into hermetic-seal relationship with the container neck, thereby securing the tubular member to the container neck and also forming a frangible line of weakness between the outer closure and the neck, the frangible line of weakness being formed by the relatively sharp rim of the mandrel;

subsequent to said mandrel advancement step, blow-molding the container body by injecting fluid through both the supply mandrel and the tubular member;

filling the container with the contents to be stored therein, through both the supply mandrel and the tubular member;

withdrawing the supply mandrel, leaving the tubular member permanently secured in the container neck portion;

subsequent to said mandrel withdrawal step, attaching a cap to the dispensing outlet; and subsequent to said cap attachment step, forming the outer closure about the dispensing outlet so that the outer closure encloses the dispensing outlet.

* * * * *